United States Patent [19]

Ostarello et al.

[11] Patent Number: 5,033,435
[45] Date of Patent: Jul. 23, 1991

[54] FLUID CONDUIT SYSTEM INCORPORATING SELF-ALIGNING FITTING

[75] Inventors: Joseph V. Ostarello, Woodridge; Eugene Lingl, Lombard; Robert Mackert, Downers Grove, all of Ill.

[73] Assignee: Navistar International Transportation Corp., Chicago, Ill.

[21] Appl. No.: 350,424

[22] Filed: May 10, 1989

[51] Int. Cl.$^5$ ............................................. F02M 55/02
[52] U.S. Cl. ................................. 123/469; 123/468; 285/354; 285/386
[58] Field of Search ................... 123/456, 468, 469; 285/386, 354

[56] References Cited

U.S. PATENT DOCUMENTS

| | | | |
|---|---|---|---|
| 3,783,842 | 1/1974 | Kuhn | 123/469 |
| 4,073,515 | 2/1978 | Perera | 285/386 |
| 4,384,557 | 5/1983 | Johnson | 123/468 |
| 4,445,713 | 5/1984 | Bruning | 123/469 |
| 4,665,876 | 5/1987 | Hashimoto | 123/468 |
| 4,705,306 | 11/1988 | Guido | 123/469 |
| 4,877,270 | 10/1989 | Phillips | 285/354 |
| 4,893,601 | 1/1990 | Sugao | 123/468 |

FOREIGN PATENT DOCUMENTS 1260967 12/1961 France ............................ 123/468

OTHER PUBLICATIONS

"1988 SAE Handbook", vol. 2, pp. 19.162-19.176, Society of Automotive Engineers, 1988.

Primary Examiner—Carl Stuart Miller
Attorney, Agent, or Firm—F. David AuBuchon; Dennis K. Sullivan

[57] ABSTRACT

A fluid conduit system especially for high pressure fuel connections in engines comprises an elongate tube having a fitting asssembly mounted at each end thereof. Each fitting assembly is identical to the other and includes a stepped outer diameter sleeve member having a larger diameter distal portion and a narrower proximal portion. A nut is slidably received about the tube and has a threaded bore therein which is of a diameter greater than the diameter of the larger diameter portion of the sleeve member and a proximal flange surrounding a reduced diameter bore having a diameter substantially greater than the diameter of the narrower portion of the sleeve member but less than the diameter of the larger diameter portion of the sleeve member. The nut further includes an area of undercut along an inner surface thereof adjacent the proximal flange disposed to receive therein the edge of the larger diameter portion of the sleeve member when the nut is radially offset from a centered position about the tube up to a position where the narrower portion of the sleeve member abuts against the flange of the nut.

13 Claims, 3 Drawing Sheets

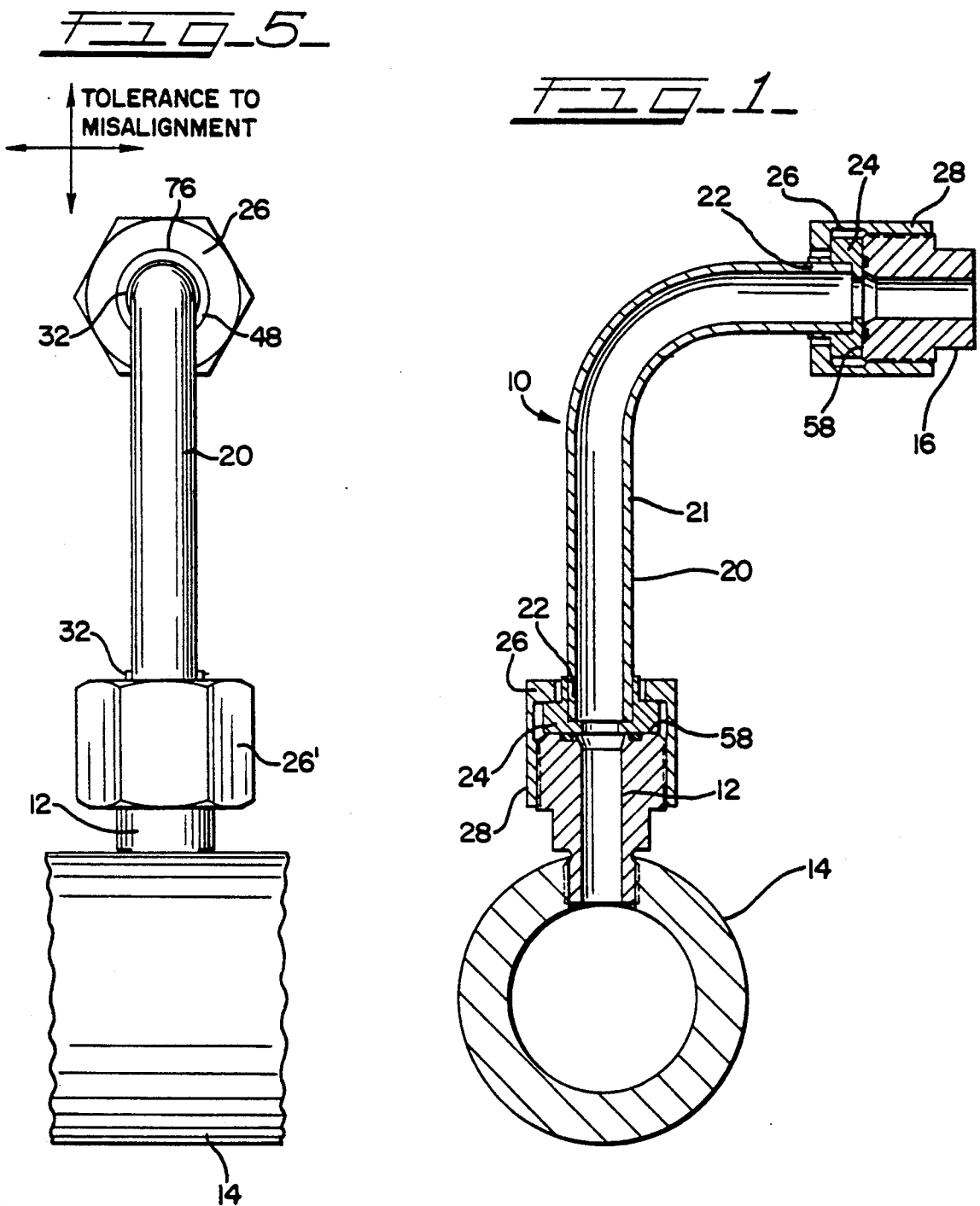

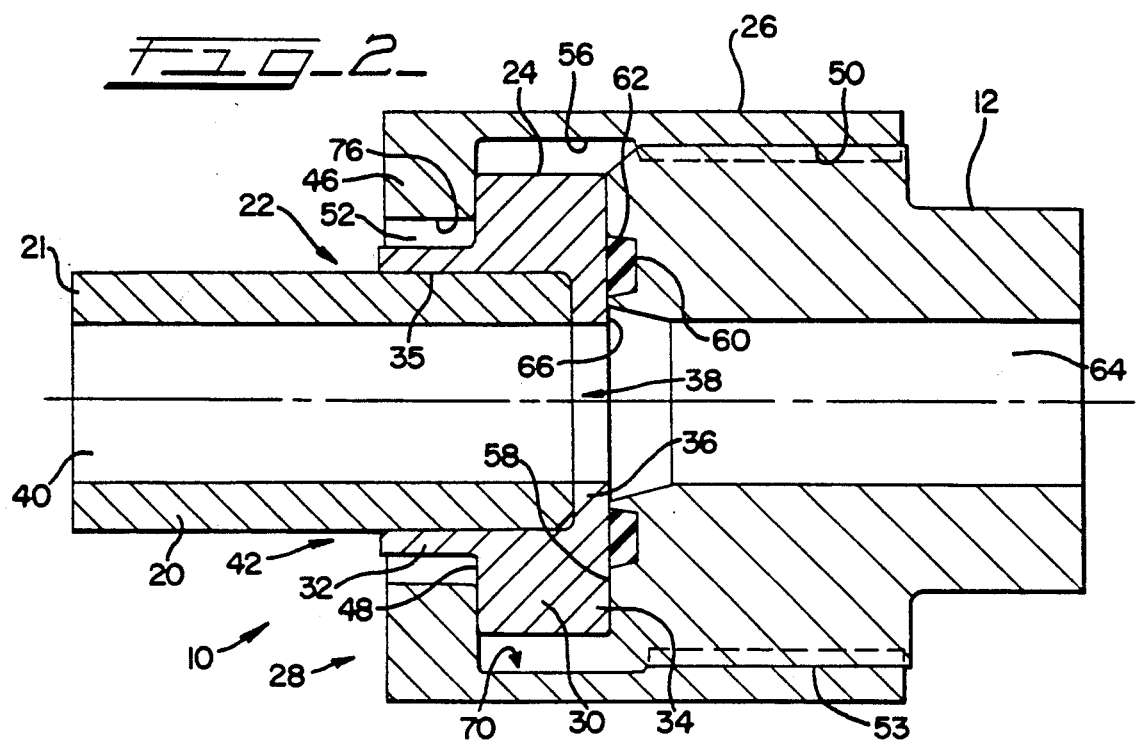
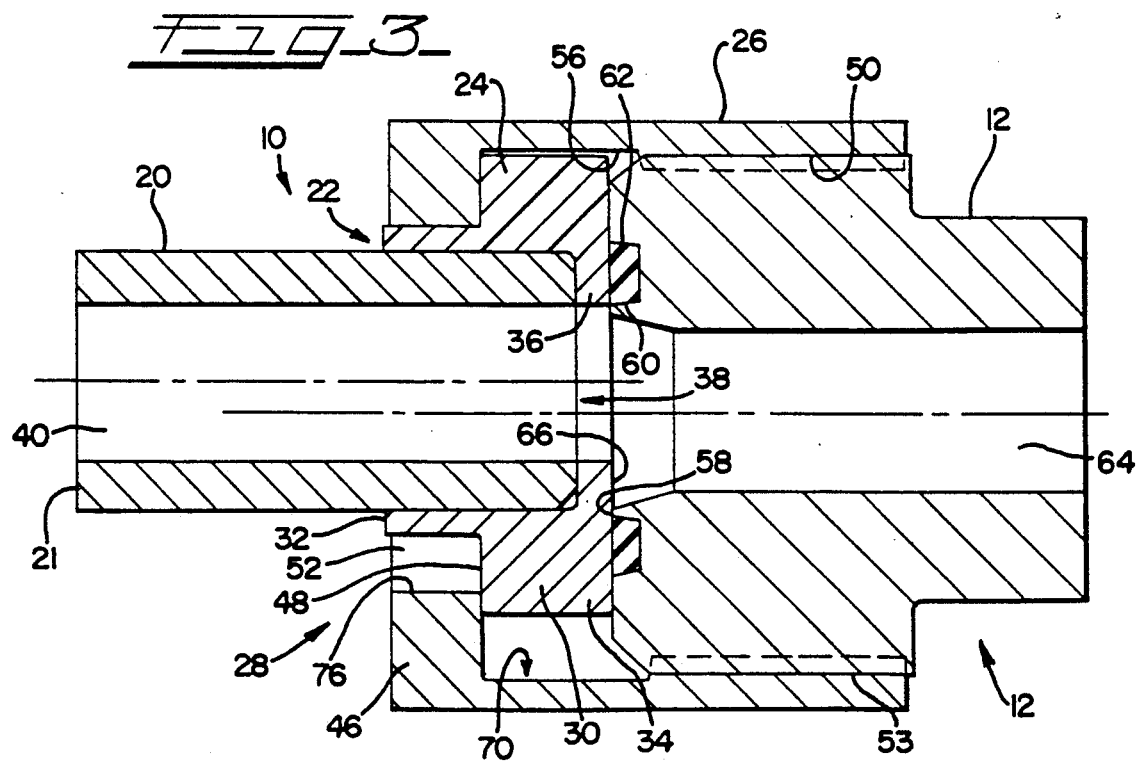

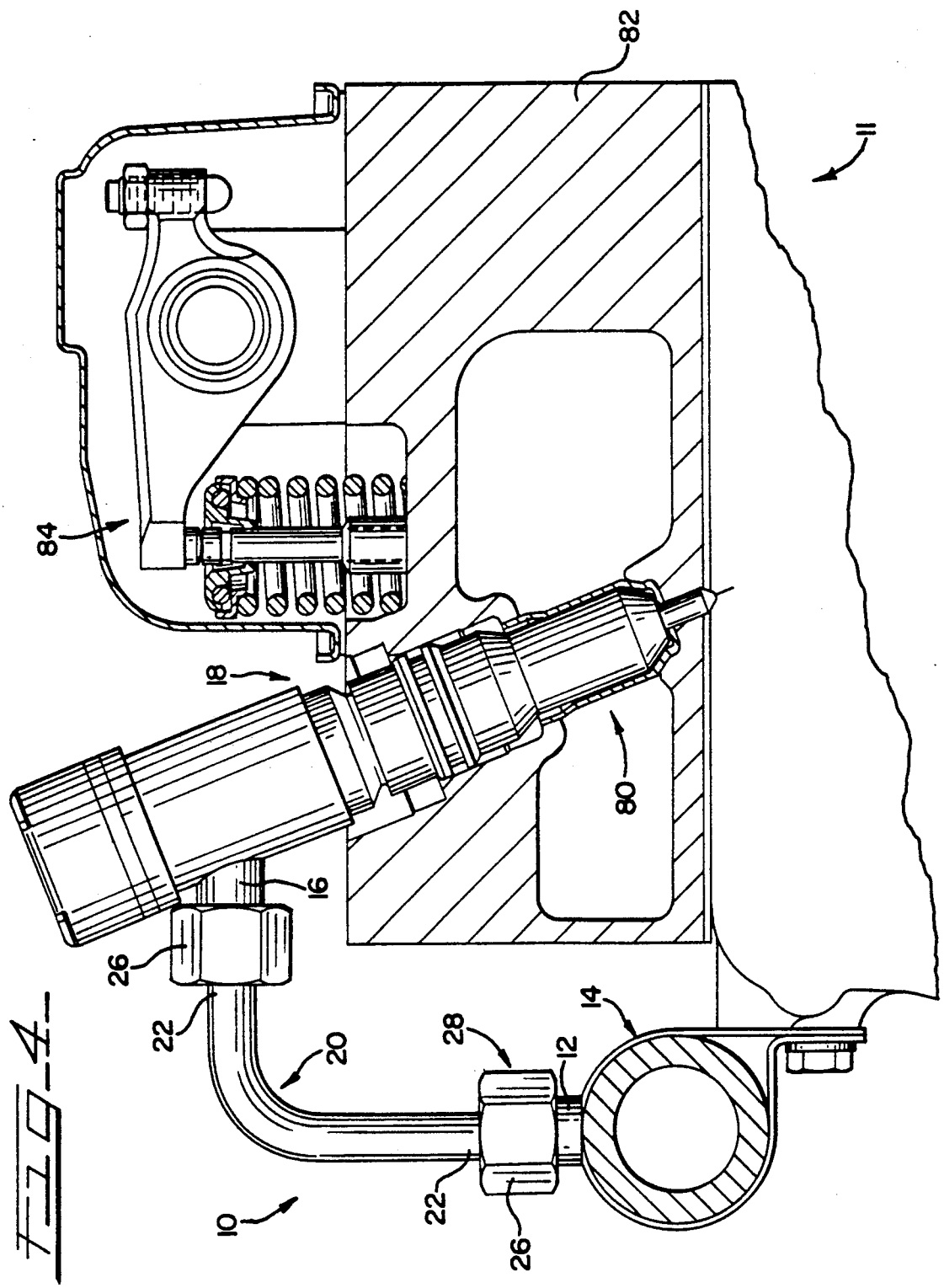

FLUID CONDUIT SYSTEM INCORPORATING SELF-ALIGNING FITTING

BACKGROUND OF THE INVENTION

The present invention relates to an end fitting for a hard line tube of the type used for injection pipes in diesel engines and the fluid conduit system formed therewith. More specifically, the fluid conduit system incorporating such fitting will compensate for misalignment between the centerline of the tube and the centerline of a fixed connector to which the tube is coupled via the fitting, such misalignment resulting from normal manufacturing variables.

THE PRIOR ART

Numerous fluid conduit systems including tube end fittings incorporating O-ring face seals, or other types of face seals in general, have been proposed. Standards for such fittings and seals, and particularly O-ring type face seals, may be found in the SAE Handbook, Vol. 2, Parts and Components, in Standard SAE J1453 (revised July,1987).

Many prior fluid conduit systems, such as those used in delivering high pressure fuel to a plurality of injection nozzles of diesel engines, especially common rail systems, involve using a fuel manifold and non-positive sealing methods, such as those provided by fitting O-rings into bores. Assembly alignment generated by such systems is at best an average of the tolerances of the components with each of the plurality of fuel delivering assemblies not being separately alignable.

As will be defined in greater detail hereinafter, the end fitting, and the fluid conduit system formed therewith, of the present invention differs from those previously proposed by compensating for a wide range of misalignments which typically occur between the centerline of the conduit system and the centerline of a structure, such as a fixed connector, to which an end of the conduit system is connected.

SUMMARY OF THE INVENTION

According to the invention, there is provided a fluid conduit system comprising an elongate tubing having a fitting assembly mounted to each end thereof. Each fitting assembly is identical to the other and includes a cored, stepped diameter sleeve member having a larger diameter distal end portion and a narrower proximal portion. Each sleeve member is fixed to an end of the tubing with the core diameter portion including an inwardly directed shoulder near the distal end against which the tubing end seats. A nut is slidably received about the tubing and has a threaded bore therein which is of a diameter greater than the diameter of the larger diameter distal end portion of the sleeve member. The nut includes a proximal flange having a reduced diameter throughbore of a diameter greater than the diameter of the narrower portion of the sleeve member but less than the diameter of the larger diameter end portion of the sleeve member. The nut further includes an area of undercut along an inner surface thereof adjacent the proximal flange which is sized and configured to receive therein the peripheral edge of the larger diameter end portion of the sleeve member when the nut is radially translated from a centered position about the tubing to an offset position where the narrower portion of the sleeve member abuts against the flange of the nut. The flange is further engagable in any position of offset against the proximal face of the larger diameter portion of the sleeve member to force the opposed distal sealing face of the larger diameter portion of the sleeve member against the sealing face of a connector to which the fitting is to be engaged.

BRIEF DESCRIPTION OF THE DRAWINGS

FIG. 1 is a cross-sectional view through a fluid conduit system incorporating a tube having a fitting of the present invention at each end thereof and showing the conduit system mounted between a fuel injector connector and a fuel manifold connector of a vehicle engine.

FIG. 2 is an enlarged longitudinal section through one end of the conduit system and shows a fitting thereof engaged to a fixed connector without any centerline misalignment between the connector and the conduit system.

FIG. 3 is an enlarged longitudinal section through one end of the conduit system and shows a fitting thereof engaged to a fixed connector under circumstances where a centerline misalignment exists.

FIG. 4 is a perspective side view, partially in section, of the conduit system of the present invention engaged between a fixed fuel injector connector and a fixed fuel manifold connector of a vehicle engine.

FIG. 5 is an elevation of the conduit system of FIG. 1.

DESCRIPTION OF THE PREFERRED EMBODIMENT

Referring now to the drawings, there is illustrated in FIGS. 1 and 4 a fluid conduit system 10 constructed in accordance with the teachings of the present invention. The conduit system is intended for use with a high pressure fuel injected diesel engine 11 of a vehicle, although the conduit system 10 may be used with any fluid or hydraulic system requiring communication of high pressure fluid between two fixed connectors.

The conduit system 10 is shown in FIG. 4 connected between a fixed connector 12 of a fuel manifold 14 and a fixed connector 16 of a fuel injector 18. The connectors 12 and 16 have sealing faces 58 (FIG. 1) which lie in nonparallel planes, being shown here in planes which are perpendicular.

The conduit system 10 includes a tube 20, here forming an L-shaped fluid conduit, having a reinforcing sleeve member 24 mounted at each end 22 thereof. Mounting nuts 26 are receivable and engagable over each reinforcing sleeve 24 to form a female-type fittings 28 at each end 22 of the tube 20 which engage the male-type fixed connectors 12,16 on the manifold 14 and fuel injector 18 respectively.

Turning now to FIG. 2, there is illustrated therein an enlarged longitudinal cross-section through the area of engagement between one end 22 of the conduit system 10 and one of the fixed connectors 12,16, the connection of the other end of the conduit system to the other fixed connector being identical except for being oriented perpendicularly to the first end. As shown, the conduit system 10 includes the tube 20 which is preferably made of steel having a relatively thin wall 21 and is bent to a required angle for engagement with and between fixed connectors, such as the fuel injector connector 16 and the fuel manifold connector 12.

To reinforce the ends 22 of the thin-walled tube 20, as well as for other reasons which will become apparent hereinafter, each end 22 of the tube 20 is inserted into the hollow reinforcing sleeve member 24 which, in cross section, has a stepped outer periphery. A larger diameter distal end portion 30 of the sleeve 24 forms a termination for the tube 20 and is of a longitudinal dimension approximately equal to the longitudinal dimension of the smaller diameter proximal portion 32 thereof. The sleeve member 24 is provided with a bore 35 which closely receives the tube 20 which abuts against a radially inwardly directed shoulder 36 which circumscribes a centrally located decreased diameter bore 38. The bore 38 communicates with and forms an extension of the interior fluid passage 40 of the tube 20 when the tube 20 is seated within the hollow sleeve member 24, seated against the shoulder 36, as shown. The bore 38 is of the same diameter as the diameter of the fluid passage 40 of the tube 20.

To form a unitary tube assembly 42, the mounting nuts 26 are first positioned on the tube 20 so that a threaded end portion 50 of each nut 26 is directed longitudinally outwardly for eventual engagement to a fixed connector, such as the connectors 12 and 16. Each threaded nut 26 is slidable along the tube 20 to a position where a proximal radially inwardly extending flange 46 of the nut 26 seats against the proximal face 48 of the larger diameter portion 30 of the sleeve member 24. The sleeve members 24 are then fixed over the ends 22 of the tube 20 so that the end of the tube seats against the shoulder 36 of the respective sleeve member 24. The sleeve members 24 are brazed in place on the ends 22 of the tube 20, forming the conduit system 10.

To accommodate seating of the flange 46 of the nut 26 against the proximal face 48 of the larger diameter portion 30 of the sleeve member 24, the radially inwardly extending flange 46 of the nut 26 is circumscribes a throughbore 52 which, in accordance with the invention, has a predetermined diameter significantly greater than the diameter of the sleeve member 24 along the narrower proximal portion 32 thereof but less than the diameter of the larger diameter portion 30 of the sleeve member 24. The precise sizing of the throughbore 52 allows the nut 26 to "float" radially against and along the proximal face 48 of the larger diameter portion 30 of the sleeve member 24, the necessity of which will become apparent hereinafter.

Although not illustrated, an outer surface 53 of each fixed connector 12 and 16 is threaded to received the threaded distal end portion 50 of the inner side wall 56 of the nut 26 thereover, to form a secure engagement therebetween.

A distal or sealing face 58 of each connector 12, 16 is provided with a circumferential groove 60 therein within which an O-ring 62 of corresponding dimension is received. As is conventional with this type of fitting, the circumferential groove 60 is formed at a location along the face 58 which is closer to a fluid passage 64 of the connector 12, 16 than it is to the outer surface 53 of the connector 12, 16 which is most desirable for reasons which will be disclosed in connection with the description of FIG. 3.

A distal or sealing face 66 of the sleeve member 24, when the nut 26 is threaded onto the connector 12, 16 is forced into abutment against the sealing face 58 of the connector 12, 16, compressing the O-ring 62 within the groove 60 to form a fluid tight seal between the sealing faces 58 and 66.

It will be noted that, in accordance with the invention, the side wall 56 of the nut 26 includes an undercut area 70 on the inner side wall 56 thereof located between the threaded distal end portion 50 thereof and the flange 46. The longitudinal extent of the undercut is slightly greater than the longitudinal dimension of the larger diameter portion 30 of the sleeve 24. The functionality of this undercut area 70 will become apparent in connection with the description of FIG. 3.

In FIG. 2, the alignment between the fitting 28 and the connector 12 or 16 is almost perfect, with the centerline of the tube 20, and therefore of the fluid passage 40 thereof, being the same as the centerline of the connector 12 or 16, and therefore of the fluid passage 64 thereof. Therefore, the spacing between the circumference of the narrower diameter portion 32 of the sleeve member 24 and an inner edge 76 of the flange 46 of the nut 26 is equal all the way around the sleeve 24. Also, the spacing between the larger diameter portion 30 of the sleeve member 24 and the inner side wall 56 of the nut 26 in the undercut area 70 is equal all the way around the sleeve member 24.

Such a perfect alignment between a tube 20 and a fixed connector 12, 16 is almost never seen because of normal manufacturing variables (i.e., typical drawing tolerances). If the manufacturing process were to include extremely limited tolerances, the cost of manufacture would skyrocket.

Turning now to FIG. 3, there is illustrated therein an engagement between the conduit system 10 and the connector 12 or 16 which shows the common problem of center line misalignment of the elements being engaged. In this respect, it is to be understood that the conduit system 10 is proposed for engagement between two connectors, such as the fuel manifold connector 12 and the fuel injector connector 16, having fixed positions located on the engine structure as illustrated in FIG. 4. Also, it is to be understood that several such conduit systems 10 are utilized on one engine 11, i.e., six conduit systems 10 are required for a six cylinder engine. Because of the existence of manufacturing tolerances as defined above, it is highly unlikely that near perfect alignment, as illustrated in FIG. 2, would be achievable in all of the multiple conduit systems 10 to be installed on a particular engine 11. Typically, one conduit system 10 might align perfectly with the fixed connectors 12 and 16 to which it is engaged, but the other conduit systems 10 utilized would be somewhat out of alignment. In prior systems, this might be accommodated by rebending the tubes or by beginning to thread the nuts on both connectors and gradually tightening both nuts to force the conduit system into alignment which may result in side stresses on the tube and sleeve as well as a possibly faulty seal.

FIG. 3 depicts a misalignment of the centerline or of the tube 20 of the conduit system 10 relative to the centerline of the fixed connector 12 or 16. In viewing FIG. 3, it is first of all to be assumed that the other end 22 of the tube 20 has been loosely engaged to one fixed connector, such as the connector 12. Because of manufacturing tolerances, it is usually found that the other end 22, as depicted, will not precisely align over the opposite connector, such as the connector 16. So long as such misalignment is not so severe that the threaded distal end portion 50 of both nuts 26 of the conduit system 10 cannot be threadedly engaged over the connectors 12 and 14, respectively, the conduit system 10 can compensate for such misalignment, and can be considered self-aligning, as illustrated.

In this respect, it is to be remembered that, until the nut 26 is tightened, it can "float" freely radially of the centerline along the proximal face 48 of the larger diameter portion 30 of the sleeve 24 in any direction until the inner end 76 of the radially inwardly directed flange 46 thereof abuts against the narrower portion 32 of the sleeve member 24, as shown in the upper half of the Figure, while the larger diameter portion 30 of the sleeve member 24 enters the undercut area 70 along the same side of the nut 26.

In such situation, the predetermined dimensioning of the bore diameter in distal shoulder 36 of the sleeve member 24 comes into play, since the sleeve member 24, along the sealing face 66 thereof, must at all times maintain compression of the O-ring 62 when a misalignment condition of fairly large magnitude exists, as shown. It will be seen that, on the diametrally opposite side of the fitting from the offset, the spacing between the sleeve member 24 and the nut 26 is as extreme as the configuration of the nut 26 and the sleeve member 24 will allow. Because the larger diameter portion 30 of the sleeve member 24 is of a predetermined dimension as defined above, the nut 26 is kept from becoming disengaged over said larger diameter portion 30 under such a large magnitude misalignment.

In FIG. 4, the conduit system 10 of the present invention is shown in one proposed use thereof. The conduit system 10 is illustrated in a profile view and is shown connected between the fixed location connector 16 of the fuel injector 18 and the fixed location connector 12 of the fuel intake manifold 14 of the engine 11. As shown, the fixed connectors 12 and 16 lie in nonparallel planes, and are preferably perpendicular to one another as shown to provide the maximum accommodation of misalignment. However, due to the geometry involved, good accommodation will result if the angle between the planes is equal to or between 45 and 135 degrees. Accordingly, to accommodate engagement of the conduit system 10 between the two fixed connectors 12 and 16, the tube 20 of the system 10 must be bent along the length thereof at a predetermined point to accommodate the planar misalignment between the connectors 12 and 16.

As illustrated in FIG. 4, an injector 80 is fixed within the cylinder head 82 of the engine 11 in a manner where the connector 16 of the injector 18 will face away from a corresponding valve assembly 84 thereof. In this particular depiction, the connector 16 is seen to lie in a horizontal plane with its sealing face lying in a vertical plane. The connector 12 of the fuel intake manifold 14, on the other hand, lies in a vertical plane, with its sealing face lying in a horizontal plane.

FIG. 5 is an elevation of the conduit system 10 and shows the misalignment tolerances of the system 10. In this respect, it will be seen when viewing the nut 26 head on, that a significant potential for radial offset in the vertical plane of the tube 20 and sleeve member 24 relative to the nut 26 has been provided, as identified by the arrows. As long as the nut 26 is not tightened, this radial offset will occur as needed when the nut 26' at the opposite end of the tube 20 is tightened down. Similarly, an equivalent amount of offset of the other end of the tube, but in the horizontal plane, may be produced as needed by tightening the nut 26 with the nut 26' slightly loose.

It will be appreciated that the conduit system 10 of the present invention is of simple design while being adaptable to compensate for manufacturing tolerances in a manner considered to be self-aligning while providing positive sealing where O-rings 62 are compressed onto and between mating compression surfaces 58 and 66.

The conduit system 10 of the present invention has a number of advantages, some of which have been described above, and others of which are inherent in the invention. Accordingly, the scope of the invention is only to be limited as necessitated by the accompanying claims.

We claim:

1. A fluid conduit system comprising:
    an elongate tube having a fluid passage and a fitting assembly mounted at each end thereof, each fitting assembly being identical to the other and including:
        a sleeve member attached to said tube and having an inner bore receiving said tube end in close fitting relation and a stepped outer diameter including a larger diameter distal portion and a smaller diameter proximal portion, said larger diameter portion including a distal end face disposed in a radial plane and having an aperture therein communicating with said fluid passage of said tube; and,
        a nut slidably receiving said tube through a threaded bore therein which is of a diameter greater than the diameter of the larger diameter portion of said sleeve member, said nut including a proximal flange surrounding a reduced diameter throughbore having a diameter substantially larger than the diameter of said narrower portion of said sleeve member but less than the diameter of said larger diameter portion of said sleeve member, said nut further including an area of undercut along an inner surface thereof adjacent to said proximal flange, said undercut being disposed to receive therein a radially outwardly circumferential portion of said larger diameter portion of said sleeve member upon said tube being radially offset from a centered position within tube, said flange being engagable against a proximal face of said larger diameter portion of said sleeve member to force said distal end face of said larger diameter portion of said sleeve member against a sealing face of a connector to which said fitting is to be engaged.

2. The conduit system of claim 1 wherein said tube is bent and said fittings are located in nonparallel planes disposed at an included angle equal to or between 45 and 135 degrees.

3. The conduit system of claim 1 wherein said nonparallel planes are perpendicular.

4. The conduit system of claim 1 wherein said sleeve members are brazed onto said tube.

5. In combination with a male connector having a fluid passage therein opening into a planar sealing face having an O-ring in a circumferential groove provided therein, said groove being positioned radially adjacent said passage, a fluid conduit system comprising:
    an elongate tube having a fluid passage and a female fitting assembly mounted at each end thereof, each fitting assembly being identical to the other and including:
        a sleeve member attached to said tube and having an inner bore receiving said tube end in close fitting relation and a stepped outer diameter including a larger diameter distal portion and a smaller diameter proximal portion, said larger diameter portion including a distal end face disposed in a radial plane and having an aperture therein communicating with said fluid passage of said tube; and, a nut slidably received about said tube and having a threaded bore therein which is of a diameter greater than the diameter of the larger diameter portion of said sleeve member, said nut including a proximal flange surrounding a reduced diameter throughbore having a diameter substantially greater than the diameter of said narrower portion of said sleeve member but less than the diameter of said larger diameter portion of said sleeve member, said nut further including an area of undercut along an inner surface thereof adjacent to said proximal flange, said undercut being disposed to receive therein a radially outwardly circumferential portion of said larger diameter portion of said sleeve member when said tube is radially offset from a centered position about said fluid passage of said male connector, said flange being engagable against a proximal face of said larger diameter portion of said sleeve member to force said distal end face of said larger diameter portion of said sleeve member against said sealing face of said connector to which said fitting is engaged, said distal end face aperture of said sleeve member being of a predetermined dimension to maintain said distal end face of said sleeve member in abutment against said sealing face of said connector to the extent that said O-ring is compressed by said distal end face of said sleeve member in all radially offset positions.

6. In combination with a base structure, said base structure having a first threaded male fluid connector disposed in fixed position thereon, said first connector having a sealing face disposed generally in a first plane, and a second threaded male connector disposed in fixed position thereon, said second connector having a sealing face disposed generally in a second plane, said second plane being disposed at an angle to said first plane, a fluid conduit system connected between said first and second connectors, said conduit system being a bent elongate metal tube having female fitting mounted to at least one end thereof, said fitting comprising:

a sleeve member attached to said tube and having an inner bore receiving said tube end in close fitting relation said a stepped outer diameter including a larger diameter distal portion and a smaller diameter proximal portion, said larger diameter portion including a distal end face disposed in a radial plane and having an aperture therein communicating with said fluid passage of said tube; and, a nut slidably received about said tube and having a threaded bore therein engaged with one of said male connectors which is of a diameter greater than the diameter of the larger diameter portion of said sleeve member, said nut including a proximal flange surrounding a reduced diameter throughbore having a diameter substantially greater than the diameter of said narrower portion of said sleeve member but less than the diameter of said larger diameter portion of said sleeve member, said nut further including a clearance area along an inner surface thereof adjacent to said proximal flange, said clearance area being sufficiently large to receive therein a radially outwardly circumferential portion of said larger diameter portion of said sleeve member upon said tube being radially offset from a centered position about said fluid passage of said one male connector to a position wherein said smaller diameter portion of said sleeve member abuts the edge of said throughbore, said flange engaging a proximal face of said larger diameter portion of said sleeve member to force said distal end face of said larger diameter portion of said sleeve member against said sealing face of said one male connector.

7. The invention in accordance with claim 6 and an "O" ring disposed between said connector sealing face and said distal end face of said sleeve member.

8. The invention in accordance with claim 7 and said fitting being attached to both ends of said tube.

9. The invention in accordance with claim 6 and said first plane being perpendicular to said second plane.

10. The invention in accordance with claim 6 and said first plane being disposed at an angle equal to or between 45 degrees and 135 degrees to said second plane.

11. In combination with an engine having a cylinder head, a fuel injector having first male fuel connector means mounted in said cylinder head, said first fuel connector means defining a fuel passage and a sealing face disposed perpendicularly to said fuel passage, said sealing face having a groove with an "O" ring seated therein, and a fuel supply means mounted on the engine, said fuel supply means having a second male connector means, said second fuel connector means defining a fuel passage and a sealing face disposed perpendicularly to said fuel passage, said sealing face having a groove with an "O" ring seated therein, a fluid conduit system connected between said first and second connector means, said conduit system being a bent elongate metal tube having a female fitting mounted to at least one end thereof, said fitting comprising:

a fitting member attached to said tube and having an inner bore receiving said tube end in close fitting relation and a stepped outer diameter including a larger diameter distal portion and a smaller diameter proximal portion, said larger diameter portion including a distal end face disposed in a radial plane and having an aperture therein communicating with said fluid passage of said tube; and, a nut slidably received about said tube and having a threaded bore therein engaged with one of said male connector means which is of a diameter greater than the diameter of the larger diameter portion of said sleeve member, said nut including a proximal flange surrounding a reduced diameter throughbore having a diameter substantially larger than the diameter of said narrower portion of said sleeve member but less than the diameter of said larger diameter portion of said sleeve member, said nut further including an area of undercut along an inner surface thereof adjacent to said proximal flange, said undercut being disposed to receive therein a radially outwardly circumferential portion of said larger diameter portion of said sleeve member upon said tube being radially offset from a centered position about said fluid passage of said one male connector, said flange engaging a proximal face of said larger diameter portion of said sleeve member to force said distal end face of said larger diameter portion of said sleeve member against said sealing face of said one male connector means and compress said "O" ring sufficiently to effect an operative seal between said faces.

12. The invention in accordance with claim 11 and said fuel supply means comprising a fuel manifold for distributing fuel to more than one injector in said cylinder head.

13. The invention in accordance with claim 11 and said distal end face aperture of said sleeve member being of a predetermined dimension to maintain said distal end face of said sleeve member in abutment against said sealing face of said connector means to the extent that said O-ring is compressed by said distal end face of said sleeve member in all radially offset positions.

* * * * *